United States Patent
Iwabuchi et al.

(10) Patent No.: US 7,131,629 B2
(45) Date of Patent: Nov. 7, 2006

(54) COMPOSITE VALVE FOR GAS SUPPLY SYSTEM

(75) Inventors: Toshiaki Iwabuchi, Gunma (JP); Satoru Fukatsu, Gunma (JP)

(73) Assignee: Kitz SCT Corporation, Tokyo (JP)

( * ) Notice: Subject to any disclaimer, the term of this patent is extended or adjusted under 35 U.S.C. 154(b) by 62 days.

(21) Appl. No.: 11/001,051

(22) Filed: Dec. 2, 2004

(65) Prior Publication Data

US 2005/0121634 A1    Jun. 9, 2005

(30) Foreign Application Priority Data

Dec. 4, 2003    (JP)    ............... 2003-405366

(51) Int. Cl.
*F16K 31/143*    (2006.01)
*F16K 31/163*    (2006.01)
*F16K 31/363*    (2006.01)
*F16K 31/383*    (2006.01)

(52) U.S. Cl. ...................... 251/63.5; 251/33
(58) Field of Classification Search ............ 251/25, 251/33, 62, 63, 63.5; 137/383, 385
See application file for complete search history.

(56) References Cited

U.S. PATENT DOCUMENTS

| | | | | | |
|---|---|---|---|---|---|
| 2,577,967 | A | * | 12/1951 | Hughes ..................... | 251/25 |
| 2,841,359 | A | * | 7/1958 | Berck ......................... | 251/25 |
| 3,101,924 | A | * | 8/1963 | Berck ......................... | 251/25 |
| 3,333,812 | A | * | 8/1967 | Mueller ................... | 137/15.24 |
| 4,615,354 | A | * | 10/1986 | Bianchi ..................... | 137/110 |

FOREIGN PATENT DOCUMENTS

JP    2561318    10/1997

* cited by examiner

Primary Examiner—Edward K. Look
Assistant Examiner—John K. Fristoe, Jr.
(74) Attorney, Agent, or Firm—Wenderoth, Lind & Ponack, L.L.P.

(57) ABSTRACT

An automatic-and-manual operation composite valve includes a valve main body into which an air is supplied and from which the air is discharged, a piston provided within the valve main body to be vertically movable by means of the air supplied or discharged and a snapping force of a spring attached to the piston, a valve body provided within the valve main body, and opened and closed by the piston, an air switch valve portion provided within the valve main body for switching air supply and air discharge and a manual operation mechanism portion for operating the air switch valve portion.

12 Claims, 10 Drawing Sheets

COMPOSITE VALVE FOR GAS SUPPLY SYSTEM

BACKGROUND OF THE INVENTION

1. Field of the Invention

The present invention relates to an automatic-and-manual operation composite valve used in an integrated gas supply system for a semiconductor manufacturing apparatus to execute a fluid control.

2. Description of the Prior Art

The integrated gas supply system used for the semiconductor manufacturing apparatus comprises, for example, an integrated gas panel 1 as shown in FIG. 12. In order to control a fluid flow path for the supplied gas, the panel 1 is provided with various valves, a filter 5, a regulator (not shown) or the like in a connectable manner midway of the fluid flow path, and these components can be arranged on a line at a time of being connected. A plurality of such panels are mounted in parallel on a gas supply system (not shown).

A valve for opening and closing the flow path of the panel 1 includes a manual operation valve 2, an automatic operation valve 3, a purge valve 4 and the like. The manual operation valve 2 is intended to open and close the valve with a manual operation handle 2a and normally provided in inlet and outlet sides of the flow path of the panel 1 so as to entirely open and close the flow path. Further, the automatic operation valve 3 is intended to open and close a valve body on the basis of a supply of compressed air, for example, and to optionally operate the valve by remote control into open and close states using an external remote controller (not shown), thereby enabling the gas to be freely supplied to an inflow side and freely discharged from an outflow side. The automatic operation valve 3 presses the valve body in a valve closing direction on the basis of a snapping force of an internally provided spring in a state in which the valve is closed. Thus, it can also serve as a check valve.

As described above, the supplied gas is generally controlled by opening and closing the flow path using the manual operation valve 2 having the manual operation handle 2a or the automatic operation valve 3 having an actuator on the basis of compressed air drive or the like. In the case of a structure in which the functions of a manual operation valve and an automatic operation valve are made integral to form a composite valve, it is possible to make the structure of the panel compact. When the valve is used on the panel, there can be obtained great advantages in that the entire length of an integrated line is shortened, that the number of the component parts can be reduced and consequently that cost can be reduced. Thus, a high utility value can be obtained.

As a valve having both functions of a manual operation valve and an automatic operation valve, there is a composite valve for a gas cylinder in which a cylinder chamber is formed in a valve main body, and a piston housed within the cylinder chamber and connected to a valve body for opening and closing a valve seat can be operated by a pressurized fluid and also with a manual operating handle (refer to Japanese Utility Model Registration No. 2561318, for example). The prior art composite valve has a structure in which a manual operation handle is combined with an air-driven automatic operation valve and operated to make an on-off control of the compressed air of the automatic operation valve.

However, in the case of using the prior art composite valve in which the manual operation handle is combined with the automatic operation valve, the following problems have been imposed. To be specific, when an excessive pressure (1470 Pa or more, for example) is applied to the gas supply side of the valve, the snapping force of the spring of the automatic operation valve cannot restrain a pressing body, the pressure goes over a gas shut-off capacity when the valve is closed, and there is a possibility of the gas leaking out of the outflow side.

Further, since the prior art composite valve has the structure in which the manual operation handle is operated in a state in which supply of the compressed air to the automatic operation valve is not shut off, in case where the pressure in the gas supply side is excessive (1470 Pa or more, for example), there is a possibility of the gas that goes over the shut-off capacity leaking out of the outflow side due to the excessive pressure even when a small amount of air is supplied, because of the presence of inside residual compressed air.

The present invention has been developed taking the conventional problems into consideration, and an object of the present invention is to provide a highly reliable automatic-and-manual operation composite valve having a compact structure and providing both a secure sealing performance of a manual operation valve in a gas supply line and a remote control operability of an automatic operation valve.

SUMMARY OF THE INVENTION

To achieve the object mentioned above, the present invention provides an automatic-and-manual operation composite valve comprising a valve main body into which an air is supplied and from which the air is discharged, a piston provided within the valve main body to be vertically movable by means of the air supplied or discharged and a snapping force of a spring attached to the piston, a valve body provided within the valve main body, and opened and closed by the piston, an air switch valve portion provided within the valve main body for switching air supply and air discharge, and a manual operation mechanism portion for operating the air switch valve portion.

In the composite valve, the valve body is a diaphragm that is separated from a valve seat with ascent of the piston and is pressed against the valve seat with the snapping force of the spring.

In the first or second mentioned composite valve, the manual operation mechanism portion comprises a manual operation handle, a stem and a pair of O-rings attached to an outer periphery of the stem, closes or opens an air supply port of the air switch valve portion and opens or closes a purge port of the valve main body for purging the air within the valve main body with the pair of O-rings by a pressings or releasing operation of the manual operation handle.

In the first or second mentioned composite valve, the manual operation mechanism portion comprises a manual operation handle and a ball valve portion provided in a lower portion of the manual operation handle and having a three-way port, the three-way port comprising an air supply port, a purge port for purging the air within the valve main body and an air supply tube part for supplying the air to one side of the piston, the air supply port and purge port being operated by a rotating operation of the manual operation handle.

Third mentioned composite valve further comprises a pressing member connected with a connection portion of a serration mechanism to a lower portion of the stem by pressing and then rotating operation of the manual operation handle and moved in an axial direction within the valve main body with an outer peripheral thread structure to press the piston or directly press the valve body at a lower end portion of the pressing member.

The fourth mentioned composite valve further comprises a pressing member connected with a connection portion of a serration mechanism to the air supply tube part of the ball valve portion by a rotating operation of the manual operation handle and moved in an axial direction within the valve main body with an outer peripheral thread structure to press the piston or directly press the valve body at a lower end portion of the pressing member.

In any one of the composite valves mentioned above, the manual operation handle is formed therein with a lock hole, the valve main body is provided with a lock plate having a lock engagement portion that is freely taken inside and outside of the valve main body and lapped with the lock hole, and the manual operation handle is firmly fixed to the valve main body with a lock member used for the lapped lock engagement portion and lock hole.

According to the first mentioned composite valve, it is possible to provide a highly reliable automatic-and-manual operation composite valve having a compact structure of a reduced number of component parts and providing both a secure sealing performance of a manual operation valve in a gas supply line and a remote control operability of an automatic operation valve.

According to the second mentioned composite valve, it is possible to mount on an integrated gas panel the composite valve having both pressure-resistance and security features of a manual operation valve and enable a replacement feature to be improved and shorten a purge time to be shortened owing to the reduction of the internal volume thereof, thereby improving the productivity there. Furthermore, it is possible to reduce the entire integrated gas panel size and make the integrated gas supply system compact.

According to the third mentioned composite valve, it is possible to infallibly shut off the supply of air and infallibly purge the air within the valve main body with a simple operation of the manual operation handle.

According to the fourth mentioned composite valve, it is possible to shut off the supply of air and purge the air within the valve main body with a simple rotating operation of the manual operation handle.

According to the fifth or sixth mentioned composite valve, it is possible to securely transmit the rotation torque, thereby opening and closing the valve without making the internal structure complicated and to make an installation height low. Thus, the composite valve can contribute to a downsizing of the entire apparatus.

According to the seventh mentioned composite valve, it is possible to provide a composite valve that can prevent a malfunction and a mischief, is enhanced in safety and is improved in operation convenience as an automatic operation valve.

DESCRIPTION OF THE PREFERRED EMBODIMENTS

One embodiment of an automatic-and manual operation composite valve according to the present invention will be described with reference to FIGS. 1 to 3.

Figure 1:
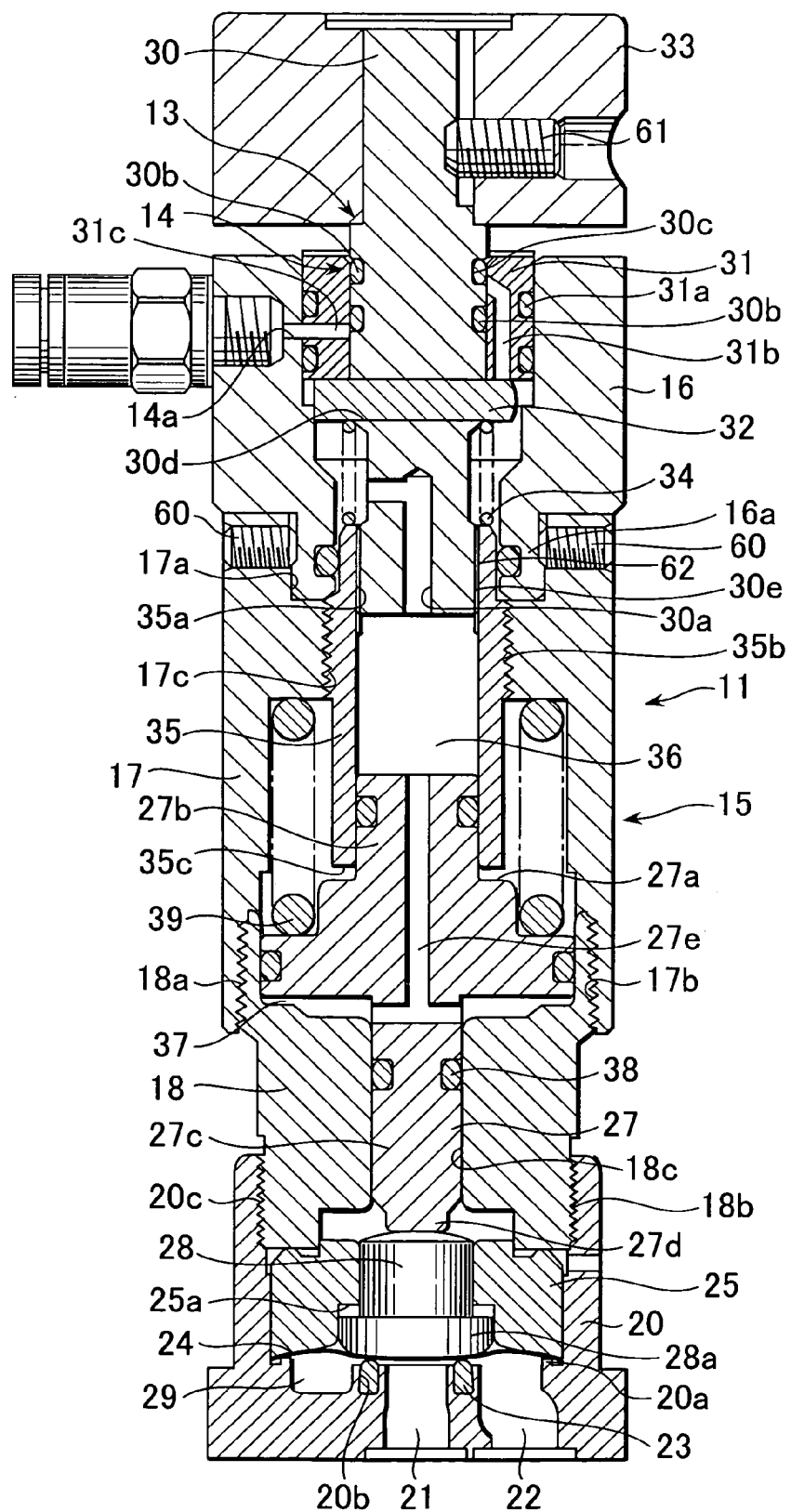
FIG. 1 is a vertical cross sectional view showing one embodiment of an automatic-and-manual operation composite valve according to the present invention.

FIG. 1 is a vertical cross sectional view showing the embodiment of the composite valve according to the present invention, in which a valve body comprises a diaphragm.

In a valve main body 11, a casing 15 comprises an upper casing 16, an intermediate casing 17 and a lower casing 18. An annular protruding portion 16a of the upper casing 16 is fastened and firmly fixed to an annular recess portion 17a of the intermediate casing 17 with a locking screw 60 in a state in which the annular protruding portion 16a is fitted to the annular recess portion 17a. On the other hand, the intermediate casing 17 and the lower casing 18 are firmly fixed to each other by screw engagement between a female thread 17b formed in the intermediate casing 17 and a male thread 18a formed on the lower casing 18. Further, a base 20 is firmly fixed by screw engagement between a female thread portion 20c of the base 20 and a male thread portion 18b formed on a lower portion of the lower casing 18.

A manual operation-mechanism portion 13 comprises a manual operation handle 33, a stem 30 and a pair of O-rings 30b attached to the outer periphery of the stem 30. The stem 30 is fitted in a tightly sealed state to the inner peripheral surface side of an annular member 31 that is closely attached and fixed to the inner side of the upper casing 16 via an O-ring 31a so that the stem is rotatable and slidable with respect to the annular member 31. Reference numerical symbol 14a denotes an air supply port formed in the upper casing 16 for supplying operation air from the outside into the valve main body 11. The pressing operation of the manual operation handle 33 allows the O-rings 30b attached to an attachment groove 30c of the stem 30 to seal an air supply hole 31c of the annular member 31 communicating with the air supply port 14a and therefore open or close the air supply port 14a of an air switch valve portion 14 and open or close a purge hole 31b for purging the operation air within the valve main body 11 in the manner mentioned below, thereby discharging the operation air within the valve main body 11.

Further, the stem 30 is provided therein with a through hole 30a through which the operation air from the air supply port 14a can be supplied into and discharged from the valve main body 11.

A parallel pin 32 is attached to a mounting hole 30d of the stem 30 to maintain the states assuming when the stem 30 slides and rotates.

The manual operation handle 33 is connected to the stem 30 with a locking screw 61 and rotated to rotate the stem 30. The manual operation handle 33 has a structure that is pushed and turned at the operation to close the valve.

A tubular pressing member 35 is provided in the inner peripheral surface side thereof with a female side serration 35a that is engaged with a male side serration 30e formed on the stem 30. By the rotating operation after the pressing operation of the manual operation handle 33 of the manual operation mechanism portion 13, the stem 30 and pressing member 35 are connected to each other with a connection portion 62 comprising the male side serration 30e of the stem 30 and the female side serration 35a of the pressing member 35, This serration structure enables the rotation of the stem 30 to be transferred to the pressing member 35. Reference numeral 34 denotes a coil spring interposed between the stem 30 and the pressing member 35. Normally, the spring 34 elastically biases the stem 30 in the upward direction.

The pressing member 35 is formed in the outer peripheral surface side thereof with a male thread 35b. The intermediate casing 17 is formed therein with a female thread 17c screw-engaged with the male thread 35b. Thus, an outer peripheral thread structure is formed. This structure enables the pressing member 35 to be moved upward and downward with respect to the intermediate casing 17 when rotating the pressing member 35. The pressing member 35 is moved in an axial direction within the valve main body 11 to press a piston 27 provided within the valve main body 11 against a lower end portion 35c of the pressing member 35. However, the lower end portion 35c may be structured to directly press the valve body 24. Further, the connection portion 62 may have a structure other than the serration structure.

The piston 27 has a diameter-reduced upper portion 27b formed at the upper side thereof inserted into a lower inner peripheral surface of the pressing member 35, a diameter-reduced lower portion 27c formed at the lower side thereof inserted into an attachment hole 18c provided in the lower casing 18. Reference numerical symbol 27a denotes a step portion having a larger diameter than the diameter-reduced upper portion 27b. The lower end portion 35c of the pressing member 35 is to be pressed against the step portion 27a. Reference numerical symbol 27e denotes a through hole formed in the piston 27 to allow a first air chamber 36 formed in the pressing member 35 (corresponding to a flow path between the stem 30 and the piston 27) and a second air chamber 37 formed in the lower casing 18 (between the piston 27, and the casing 18) to communicate with each other.

The piston 27 slides in a direction close to and apart from the valve body 24 in response to the supplied operation air passing through the through hole 30a of the stem 30 and supplied into and discharged from the first air chamber 36 in the valve main body 11 to enable the valve to be opened and closed. The piston 27 is formed on the lower end thereof with a pressing member 27d for pressing a slide member 28. Further, reference numeral 38 denotes an O-ring that seals between the piston 27 and the lower casing 18.

An upstream side flow path 21 and a downstream side flow path 22 constituting a gas flow path are communicated with each other within the base 20 by a valve chamber 29 and are respectively communicated with external gas flow paths (not shown). An annular groove 20b is provided near an outlet of the upstream side flow path 21 between the upstream side flow path 21 and the valve chamber 29, and a valve seat 23 is attached to the annular groove 20b.

The valve body 24 comprises a disk-shaped diaphragm and is attached so as to pinch an outer diameter-surface side thereof between an annular protruding portion 20a formed in an inner side of the base 20 and a bottom surface side of a cylindrical hood 25 inserted into the base 20. The valve body 24 is moved to contact with and separate from the valve seat 23 to open and close the upstream side and the downstream side flow paths 21 and 22.

The slide member 28 is interposed between the valve body 24 and the piston 27 to press the valve body 24. The slide member 28 has an expanded portion 28a to be engaged with a step portion 25a formed in the hood 25, thereby limiting upward slide movement of the slide member.

A spring 39 having a snapping force for snapping the piston 27 in a direction of closing the valve body 24 is attached between the intermediate casing 17 and the piston 27 and normally energize the piston 27 elastically to maintain a closed state of the valve body 24.

The automatic-and manual operation composite valve according to the present invention has the manual operation mechanism portion 13 that controls the valve body 24 provided within the valve main body 11 to be opened and closed with the air drive source. The air switch valve portion 14 provided within the valve main body 11 is adapted to stop the supply of the operation air to the valve main body 11 via the manual operation mechanism portion 13 and discharge the operation air within the valve main body 11 to the outside. In particular, the composite valve according to the present embodiment supplies the operation air to one side of the piston 27 provided within the valve main body 11 to allow the piston 27 to move upward, thereby disconnecting the valve body 24 (diaphragm) from the valve seat 23, utilizes the snapping force of the spring 39 attached to the piston 27 to press the diaphragm 24 against the valve seat 23 to close the valve, and utilizes the pressing operation of the manual operation mechanism portion 13; to close the air switch valve and purge the operation air within the valve main body 11.

Figure 6:
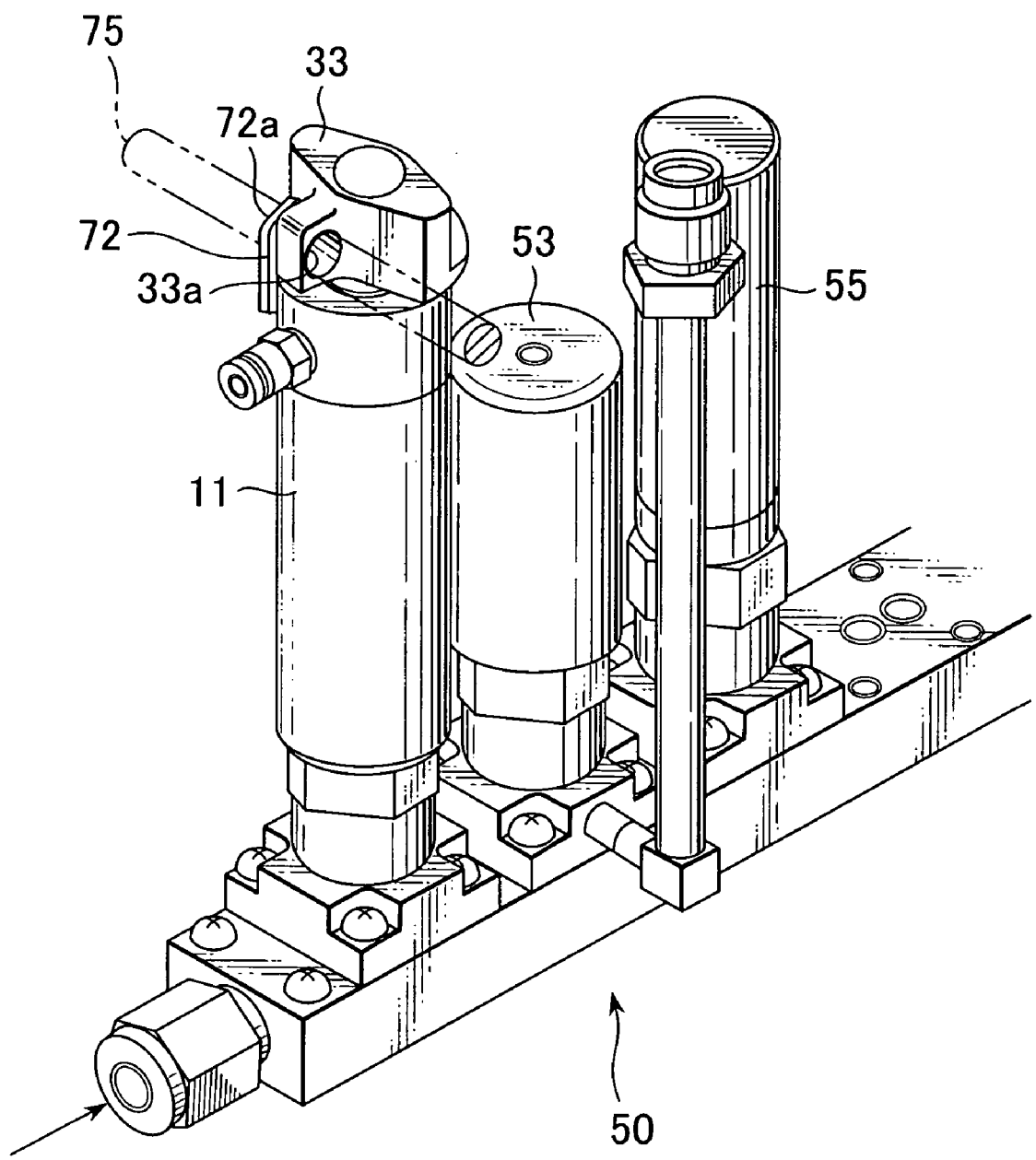
FIG. 6 is a perspective view showing an example of an integrated gas panel.
Figure 7:
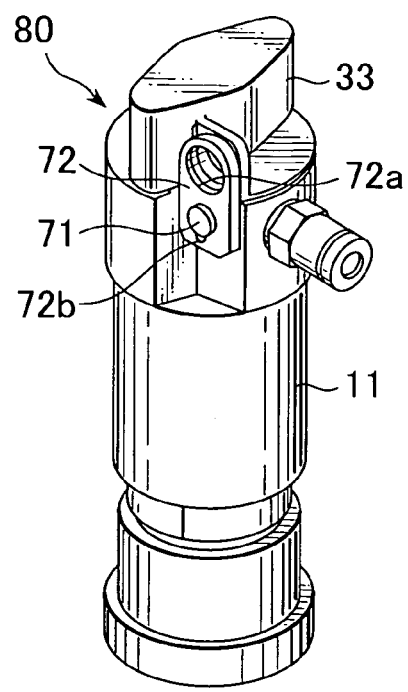
FIG. 7 is a perspective view showing still another embodiment of the automatic-and-manual operation composite valve according to the present invention.
Figure 8:
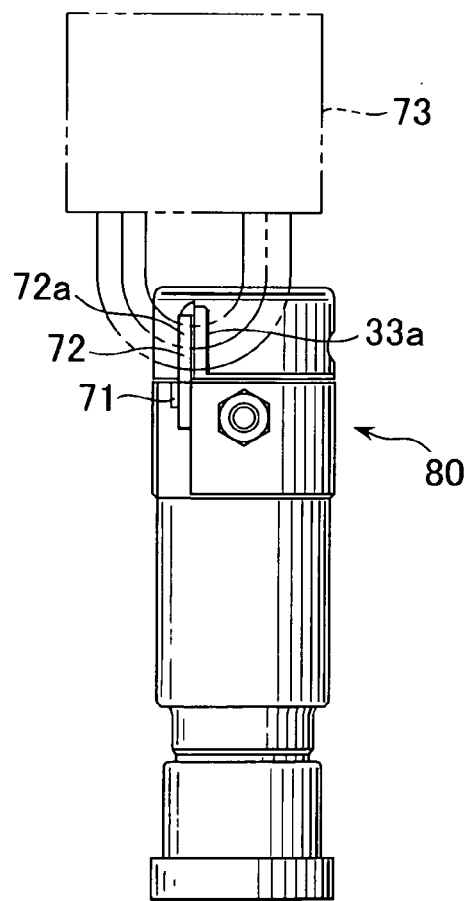
FIG. 8 is a front elevational view showing the embodiment of FIG. 7.

The valve main body 11 according to the present invention can be mounted, for example, on an integrated gas panel 50 shown in FIG. 6, as its flow path of the panel and used as a composite valve having both functions of an automatic operation valve and a manual operation valve function. In FIG. 6, reference numeral 53 denotes a purge valve and reference numeral 55 denotes a filter.

Next, a description will be given of a motion of the composite valve according to the present invention.

The operation handle 33 shown in FIG. 1 is in an open state in which the operation air can be supplied and exhausted and in a state in which the opening and closing operation of the valve body 24 can be executed with the air switch valve portion 14. In the drawing, there is established a state in which the supply of the operation air to the air supply port 14a is stopped when the operation handle 33 is in an opened state and in a state in which the operation air has been discharged from the inside of the valve main body 11. When the supply of the operation air has been stopped, the operation air becomes in a state of getting away from the second air chamber 37. Therefore, the piston 27 moves downward owing to the snapping force of the spring 39, and the valve body 24 is seated on the valve seat 23, whereby the valve closed state is established.

Figure 2:
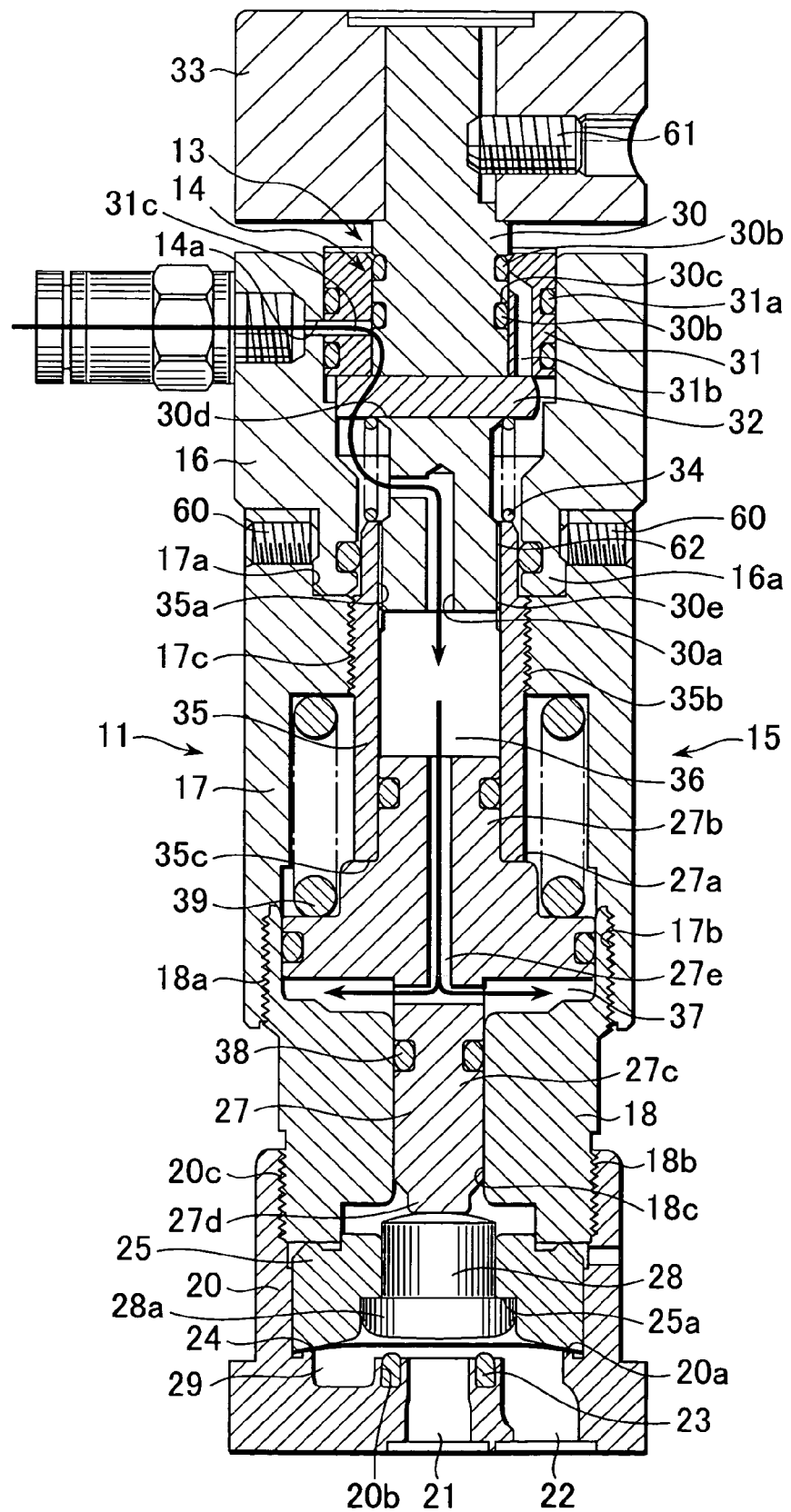
FIG. 2 is a vertical cross sectional view showing a state in which the composite valve of FIG. 1 is opened.

In FIG. 2, when supplying the operation air into the valve main body 11 from the air supply port 14a, the operation air enters the inside of the upper casing 16, passes through the through hole 30a of the stem 30, then through the first air chamber 36 and then through the through hole 27e of the piston 27 into the second air chamber 37. The operation air is stored in the second air chamber 37, whereby the piston 27 slides to an upper side in the drawing against the snapping force of the spring 39. Accordingly, the slide member 28 is released from the pressing force applied by the pressing portion 27d on the leading end side of the piston 27, the valve body 24 pressed by the slide member 28 is in the valve opening state, and the upstream side flow path 21 and the downstream side flow path 22 are communicated with each other to form the gas flow path.

Figure 3:
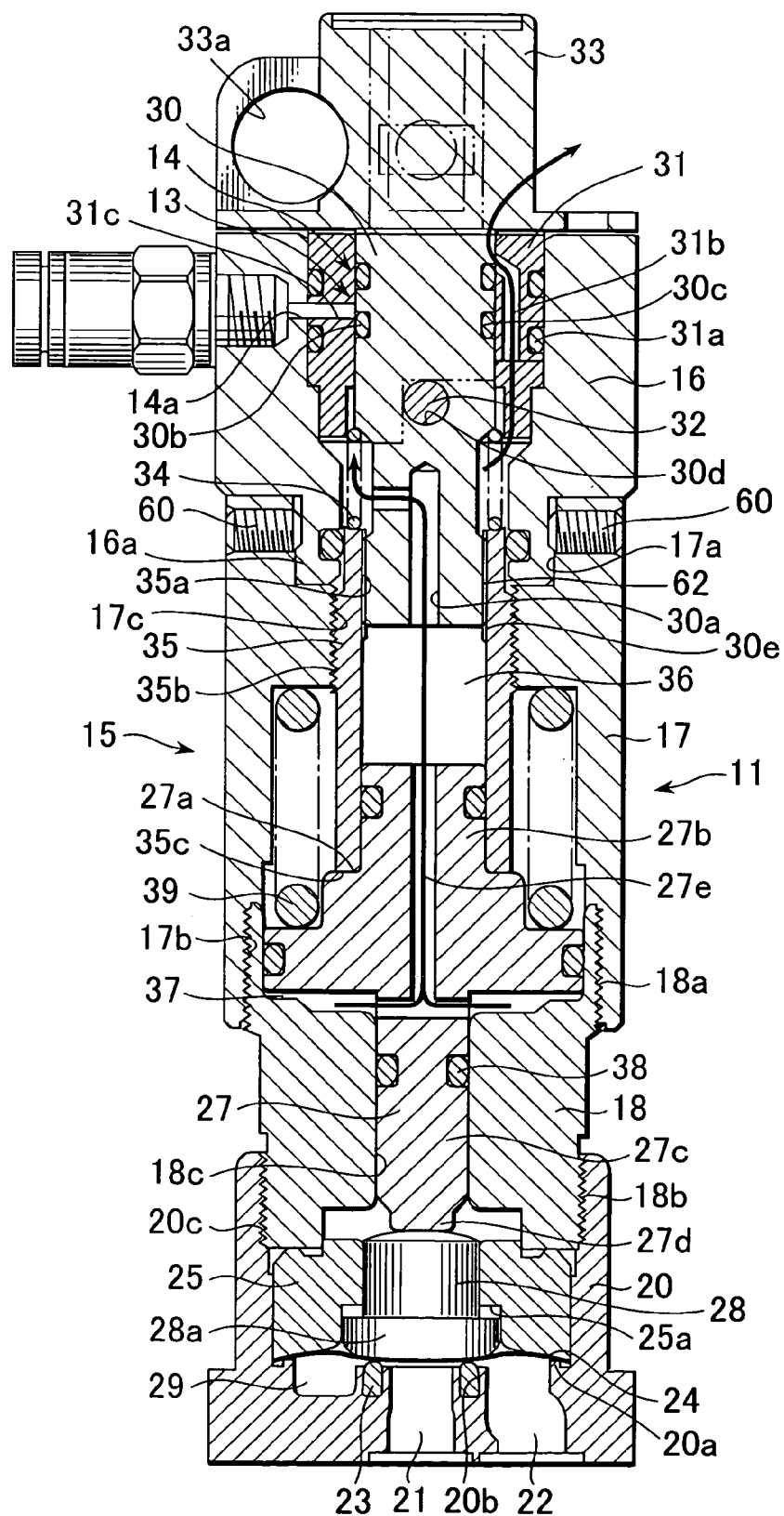
FIG. 3 is a vertical cross sectional view showing a state in which a manual operation handle of the composite valve shown in FIG. 1 is rotated.

In FIG. 3, the manual operation handle 33 is in a closed state. As mentioned above, since the composite valve of the present invention has a structure in which the air switch valve portion 14 provided within the valve main body 11 stops supplying the operation air to the valve main body 11 via the manual operation mechanism portion 13, the valve body 24 can be operated by the manual operation mechanism portion 13 in addition to the ordinary valve opening or closing operation achieved by supplying or discharging the operation air to or from the air switch valve portion 14. In addition, the manual operation handle 33 can be operated even in a state in which the operation air is supplied to the air supply port 14a. Thus, this operation can securely achieve the valve closed state.

In the drawing, when pressing the manual operation handle 33 downward, the stem 30 connected to the manual operation handle 33 slides with respect to the annular member 31 fitted to the upper casing 16. At this time, the air supply port 14a is sealed by the O-ring. 30b attached to the stem 30, whereby it is possible to forcibly stop supplying the operation air to the manual operation mechanism portion 13 and prevent the operation air from flowing into the valve.

Furthermore, at this time, since the purge hole 31b which has been sealed by the O-ring 30b before operating the manual operation handle 33 is communicated with the ambient air, the operation air stored in the valve main body 11, such as in the through hole 30a of the stem 30, in the through hole 27e of the piston 27, in the first air chamber 36 and in the second air chamber 37, is discharged from the purge hole 31b in the direction indicated by the arrow in FIG. 3.

As a result, the piston 27 moves downward by the snapping force of the spring 39, and the valve body 24 is seated on the valve seat 23, thereby achieving the valve closed state. Further, when the rotating operation of the manual operation handle 33 in the pressed state is executed, the pressing member 35 is going to rotate because the stem 30 and the pressing member 35 are coupled by means of the connection portion 62. Since the male thread 35b provided on the outer peripheral surface side of the pressing member 35 is engaged with the female thread 17c of the intermediate casing 17, the rotating pressing member 35 slides toward the piston 27. Since the lower end portion 35c of the pressing member 35 is brought into collision against the step portion 27a of the piston 27, it is possible to restrict the motion of the piston 27. Since the piston 27 is moved and pressed by the pressing member 35 utilizing the screw engagement thereof, the pressing member 35 does not move even if an upward force is applied to the piston 27.

Accordingly, even in case where excessive pressure is applied to the upstream side flow path 21, it is possible to securely seal the excessive pressure, and there is no possibility of the gas leaking out to the outflow side. In this case, since the manual operation handle 33, when pushed and rotated, intends to maintain a state in which the parallel pin 32 is engaged with a lock portion (not shown) for 90-degree rotation provided within the upper casing 16, it is possible to maintain the valve closed state on the basis of the high gas closing capacity achieved by the manual operation mechanism portion 13.

Further, since the supply of the operation air to the air switch valve portion 14 is forcibly stopped when the opening or closing operation is executed with the manual operation mechanism portion 13 and since the operation air remaining within the valve main body 11 is discharged to the external portion, the valve body does not operate suddenly even if the pressure in the upstream side flow path 21 that is the gas supply side is excessive when supplying the operation air, whereby there is no possibility of the gas going over the gas closing capacity leaking out to the outflow side.

Furthermore, since the valve main body 11 is provided with the air switch valve portion 14 and the manual operation mechanism portion 13 in a coaxial direction, it is possible to save space and reply to any installation space. When the valve main body 11 is mounted on the an integrated gas panel 50, it is possible to make an entire apparatus compact. Further, since the composite valve is integrally structured, the number of the parts can be reduced, and it is possible to manufacture, the composite valve at a low cost.

FIGS. 7 to 10 show a lock mechanism. In the lock mechanism, a lock engagement portion 72a formed by boring in a lock plate 72 which is pivotally attached to the valve main body 11 with a locking pin 71 and which is telescopically provided with respect to the valve main body 11 can be overlapped with the lock hole 33a formed in the manual operation handle 33. Reference numeral 73 denotes a lock member comprising a pad lock. The lock member 73 locks the lock hole 33a and the lock engagement portion 72a overlapped with each other and enables the manual operation handle 33 to be firmly fixed to the valve main body 11.

Figure 9:
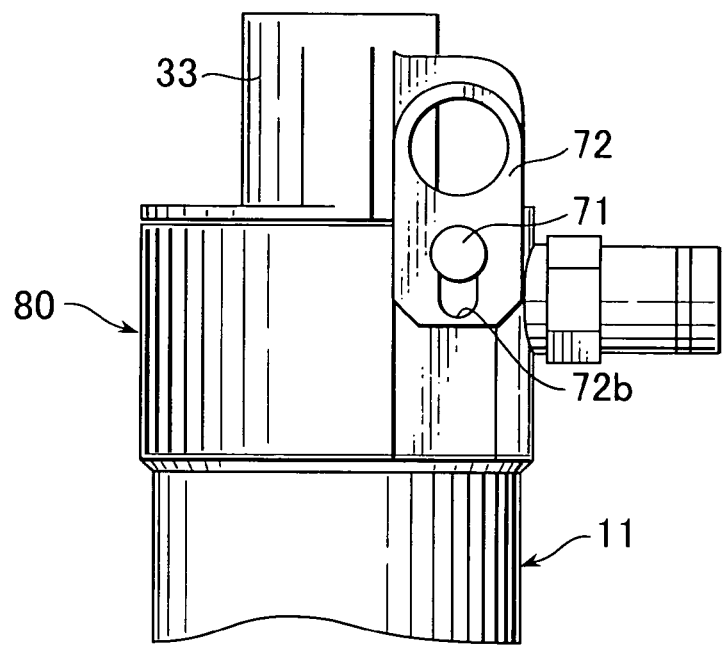
FIG. 9 is a partially enlarged front elevational view showing a lock mechanism portion.
Figure 10:
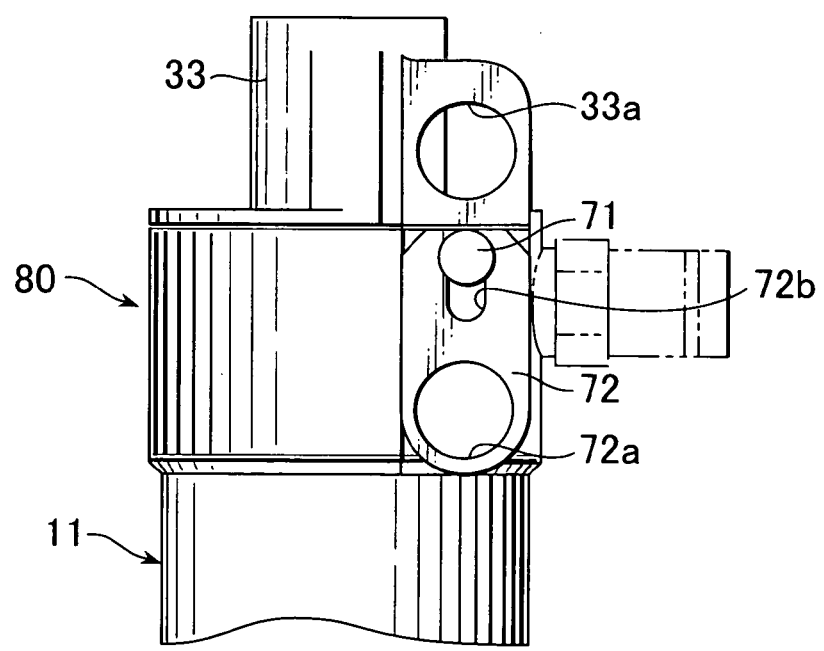
FIG. 10 is a partially enlarged front elevational view showing the lock mechanism portion.

Reference numerical symbol 72b denotes an oblong hole formed by boring in the lock plate 72 for enabling the lock plate 72 to be mounted on the valve main body 11 with the locking pin 71. When the lock plate 72 is locked, as shown in FIG. 9, since it is possible to adjust a height of the lock engagement portion 72a with respect to the lock hole 33a by moving upward and downward the lock plate 72 in a state in which the lock plate 72 is rotated upward utilizing the oblong hole 72b, it is easy to execute the locking with the lock member 73. On the other hand, when the operation handle 33 is not fixed with the lock member 73, as shown in FIG. 10, the lock plate 72 in a state in which the lock plate 72 is rotated downward is displaced downward utilizing the oblong hole 72b. Accordingly, the operation of the manual operation handle 33 can easily be operated without being hindered by the lock plate 72.

Figure 11:
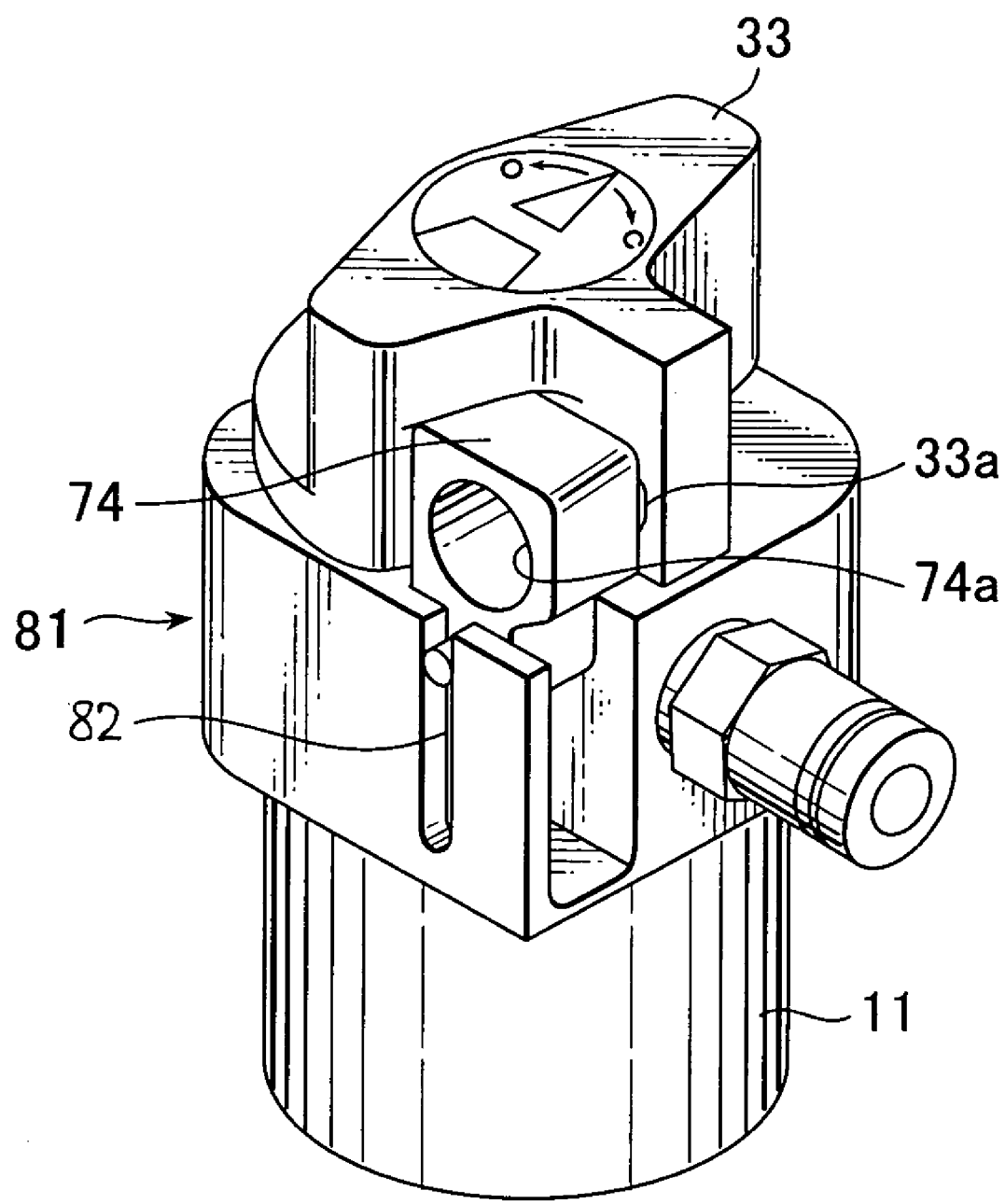
FIG. 11 is a partially enlarged perspective view showing another example of the lock mechanism portion.
Figure 12:
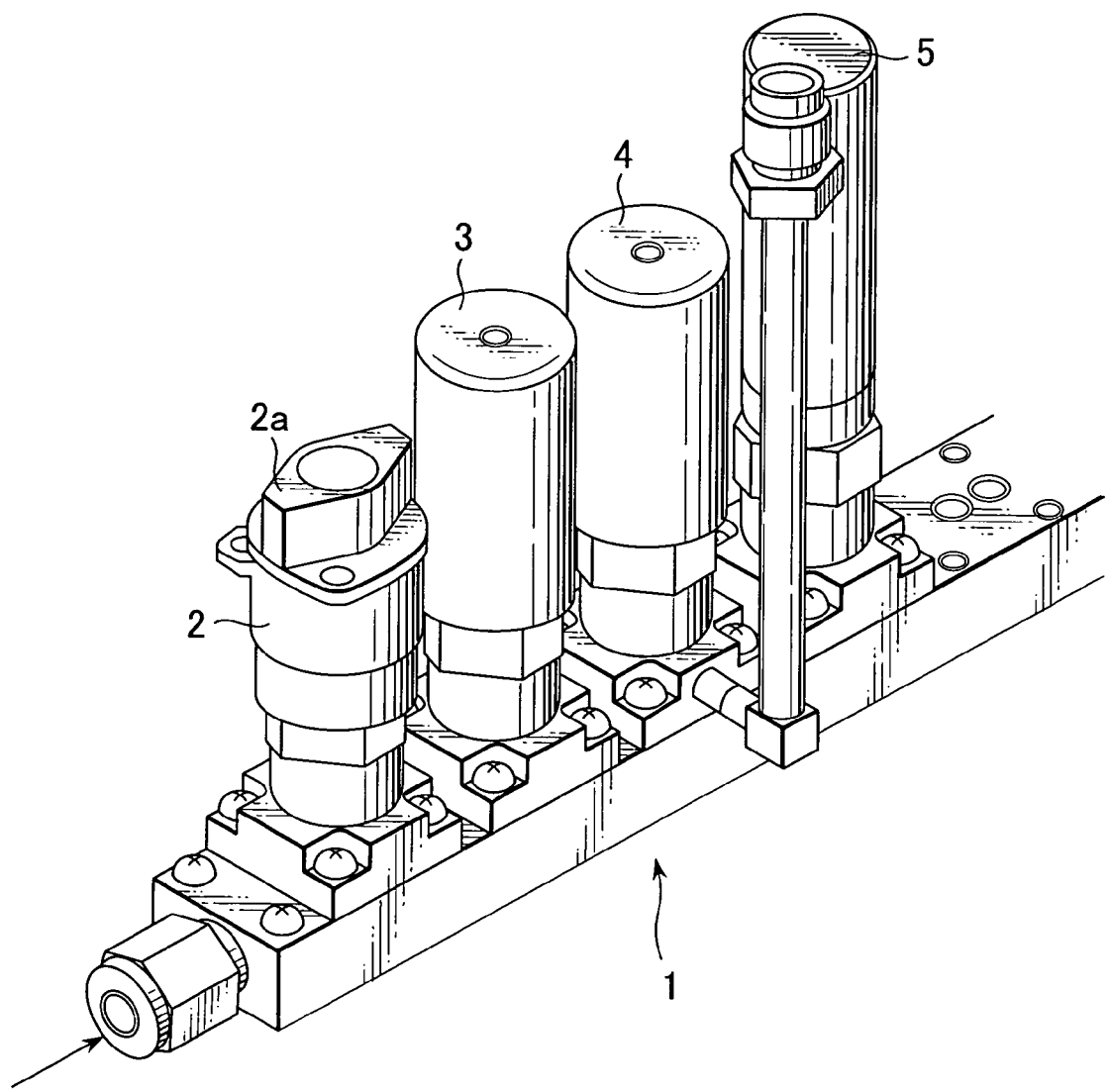
FIG. 12 is a perspective view showing a conventional integrate gas panel.

Another lock mechanism is shown in FIG. 11. In this lock mechanism, a spring 82 is attached to a bottom surface side of a lock plate 74, and the lock plate 74 is moved upward and downward by a snapping force of the spring 75, whereby a lock engagement portion 74a provided in the lock plate 74 is overlapped with the lock hole 33a.

Further, when attaching valve main bodies 11 to parallel integrated gas plates 50, a plurality manual operation handles 33 can be locked at a time utilizing a long rod member 75 (FIG. 6) inserted into the overlapped lock engagement portions 72a and lock holes 33a.

Reference numeral 80 denotes a manual operation valve main body (a valve main body) comprising a manual operation mechanism portion 13, a casing 15, an annular member 31 and an O-ring 31a. The valve main body 80 can be detached from the valve main body 11 that is the composite valve and independently used and manually operated as being mounted to an opening and closing valves, such as a glove valve, a gate valve or a ball valve. In the valve main body 80, in the same manner as the valve main body 11, and the lock hole 33a is formed in the manual operation handle 33, and the lock engagement portion 72a is formed in the lock plate 72 provided telescopically in the valve main body 80, whereby the manual operation handle 33 can be fixed using the lock member 73, such as the pad lock, with the lock hole 33a and the lock engagement portion 72a overlapped with each other. Further, as shown in FIG. 11, the spring 82 is attached to the bottom surface side of the lock plate 74 and adapted to move the lock plate 74 with its snapping force, and the lock hole 33a and the lock engagement portion are overlapped with each other.

Figure 4:
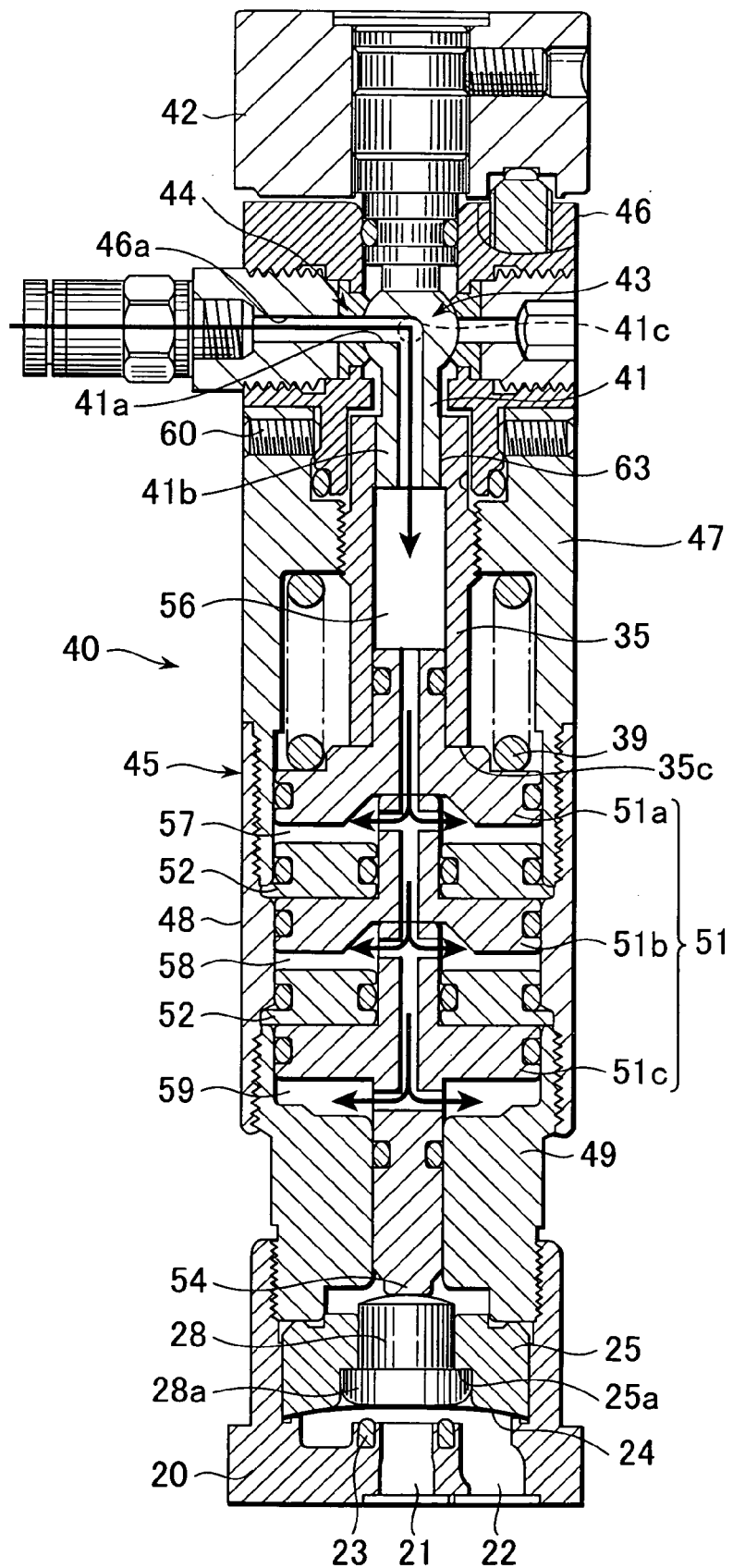
FIG. 4 is a vertical cross sectional view showing another embodiment of the automatic-and-manual operation composite valve according to the present invention.

FIG. 4 is a vertical cross sectional view showing another embodiment of the composite valve according to the present invention. In this embodiment, the same elements as those of the forgoing embodiment are denoted by the same reference numerals, and the description of the same elements will be omitted.

A manual operation mechanism portion 43 in accordance with this embodiment comprises a manual operation handle 42 and a ball valve portion 41 formed in a lower portion of the manual operation handle 42 and provided with a three-way port. The manual operation mechanism portion 43 can switch an air supply port 46a of an air switch valve portion 44 and a purge port 41c purging operation air of a valve main body 40 through a rotating operation of the manual operation handle 42. The three-way port of the ball valve portion 41 is provided with a supply tube portion 41b for supplying the operation air to one side of a piston 51.

Further, the composite valve has a structure in which the supply tube portion 41b of the ball valve portion 41 is connected to the pressing, member 35 with a connection portion 63 having a serration mechanism, for example, on the basis of a rotating operation of the operation handle 42 provided in the manual operation mechanism portion 43. The pressing member 35 is moved in an axial direction within the valve main body 40 on the basis of an outer peripheral thread structure and pressed against a piston 51 provided: within the valve main body 40 or directly pressed against the valve body 24 at a lower end portion 35c of the pressing member 35.

In FIG. 4, the manual operation handle 42 is set in an open state in which the operation air can be supplied and discharged and in which the opening and closing operation of the valve body 24 can be executed by the air switch valve portion 44.

The casing 45 comprises an upper casing 46, an intermediate casing 47, an extension casing 48 and a lower casing 49. A plurality of pistons 51 (51a, 51b, 51c) can be received within the extension casing 48 disposed between the intermediate casing 47 and the lower casing 49. Further, reference numeral 52 denotes a locking member disposed above a second piston 51b and a third piston 51c to limit a slide motion of the pistons 51b and 51c toward an upper side. Each of the pistons 51a, 51b and 51c can independently slide owing to the presence of the locking member 55 at a time of supplying the operation air.

In a state shown in FIG. 4, when supplying the operation air from an air supply port 46a of the upper casing 46, the operation air passes through an inflow port 41a of the ball valve body 41, a supply tube portion 41b communicating with the inflow port 41a and formed in a trailing direction with respect to the inflow port 41a and a first air chamber 56 between the ball valve body 41 and the first piston 52, and is fed into a second air chamber 57 surrounded by the first piston 51a and the locking member 52, a third air chamber 58 surrounded by the second piston 51b and the locking member 52 and a fourth air chamber surrounded by the third piston 51c and the lower casing 49. The operation air stored in the chambers 57, 58 and 59, thereby sliding each of the pistons 51a, 51b and 51c to an upper side in the drawing against the snapping force of the spring 39. Accordingly, the slide member 28 is released from the pressing force applied by the pressing portion 54a in the leading end side of the third piston 51c, the valve body 24 is in the valve open state, and the upstream side flow path 21 and the downstream side flow path 22 are communicated with each other to form the gas flow path. As mentioned above, since the operation air supplied from the air supply port 46a is dispersed to the second air chamber 57, third air chamber 58 and fourth air chamber 59 to independently operate the first piston 51a, second piston 51b and third piston 51c, it is possible to damper the motion between the respective pistons 51. Therefore, it is possible to prevent the piston from being rapidly slid to cause the valve open state at a time of supplying the operation air and to prevent a rapid pressure variation at a time of communicating the upstream side flow path 21 with the downstream side flow path 22.

Further, in the case of stopping the supply of the operation air to the air supply port 46a, the operation air is discharged from each of the air chambers 56, 57, 58 and 59 to enable the piston 51 to be moved downward by the snapping force of the spring 39 and the valve body 24 to be seated on the valve seat 23, thereby achieving the valve closed state.

Figure 5:
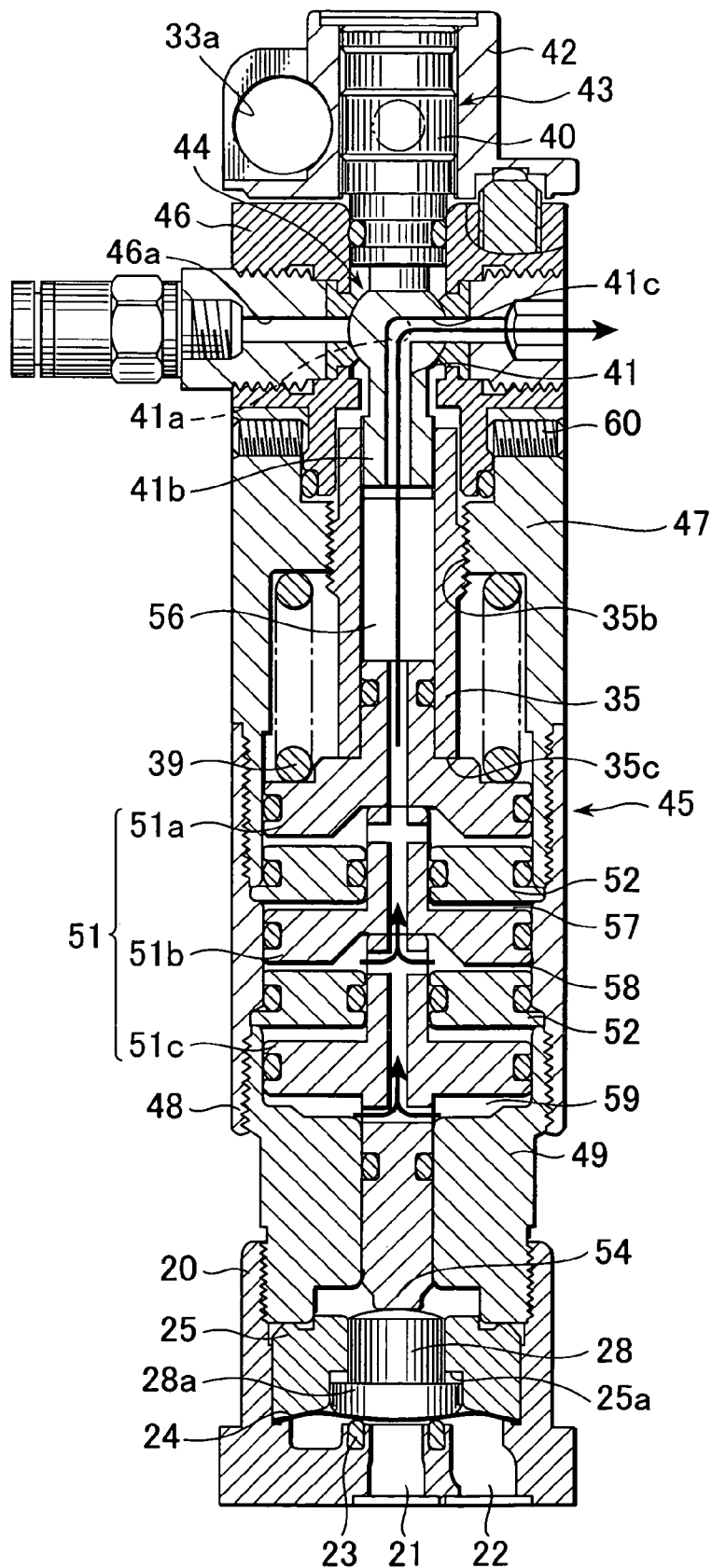
FIG. 5 is a vertical cross sectional view showing a state in which the composite valve of FIG. 4 is closed.

In FIG. 5, the valve is in a state closed by the manual operation mechanism portion 43.

In the drawing, when rotating the manual operation handle 42 by 90 degrees, a purge hole 41c which is formed laterally orthogonal to the inflow port 41a of the ball valve body 41 and communicated with the supply tube portion 41b is communicated with the ambient air. The operation air which is stored in the first air chamber 56, second air chamber 57, third air chamber 58 and fourth air chamber 59 and the like via the supply tube portion 41b of the ball valve body 41 is discharged from the purge hole 41c in a direction of an arrow in FIG. 5. Accordingly, the piston 51 is moved downward by the snapping force of the spring 39, and the valve body 24 is seated on the valve seat 23, thereby achieving the valve closed state.

Further, in the same manner as in the previous embodiment, the pressing member 35 can slide toward the piston 51 while rotating at a time of rotating the manual operation handle 42. The lower end portion 35c of the pressing member 35 can be brought into collision against the first piston 51a to restrict the motion of the entire piston 51. Further, the piston 51 can be held by the rotating movement of the pressing member 35 caused by the engagement of the pressing member 35. Accordingly, even if excessive pressure is applied to the upstream side flow paths 21, it is possible to securely maintain the pressed state of the valve body 24 by the slide member 28, to prevent the valve body 24 from naturally coming to the valve open state after being manually operated and to prevent the gas from leaking out.

While the composite valve of the present invention is particularly preferably used as being mounted on an integrated gas panel constituting a part of a gas supply system used in a semiconductor manufacturing apparatus, it can also be applied to any flow path as a valve having the structure in which the automatic operation valve and the manual operation valve are integrally formed, can be installed in various positions as a composite valve which can save space, and can be further applied to a case where a lock mechanism is added to an ordinary manual operation valve.

What is claimed is:

1. An automatic-and-manual operation composite valve comprising:
   a valve main body into which an air is supplied and from which the air is discharged;
   a piston provided within the valve main body to be vertically movable by means of the air supplied or discharged and a snapping force of a spring attached to the piston;
   a valve body provided within the valve main body, and opened and closed by the piston;
   an air switch valve portion provided within the valve main body for switching air supply and air discharge; and
   a manual operation mechanism portion for operating the air switch valve portion,
   wherein the manual operation mechanism portion comprises a manual operation handle, a stem and a pair of O-rings attached to an outer periphery of the stem, closes or opens an air supply port of the air switch valve portion and opens or closes a purge port of the valve main body for purging the air within the valve main body with the pair of O-rings by a pressing or releasing operation of the manual operation handle.

2. The composite valve according to claim 1, further comprising a pressing member connected with a connection portion of a serration mechanism to a lower portion of the stem by pressing and then rotating operation of the manual operation handle and moved in an axial direction within the valve main body with an outer peripheral thread structure to press the piston or directly press the valve body at a lower end portion of the pressing member.

3. The composite valve according to claim 2, wherein the manual operation handle is formed therein with a lock hole, the valve main body is provided with a lock plate having a lock engagement portion that is freely taken inside and outside of the valve main body and lapped with the lock hole, and the manual operation handle is firmly fixed to the valve main body with a lock member used for the lapped lock engagement portion and lock hole.

4. The composite valve according to claim 1, wherein the manual operation handle is formed therein with a lock hole, the valve main body is provided with a lock plate having a lock engagement portion that is freely taken inside and outside of the valve main body and lapped with the lock hole, and the manual operation handle is firmly fixed to the valve main body with a lock member used for the lapped lock engagement portion and lock hole.

5. The composite valve according to claim 1, wherein the valve body is a diaphragm that is separated from a valve seat with ascent of the piston and is pressed against the valve seat with the snapping force of the spring.

6. An automatic-and-manual operation composite valve comprising:
   a valve main body into which an air is supplied and from which the air is discharged;
   a piston provided within the valve main body to be vertically movable by means of the air supplied or discharged and a snapping force of a spring attached to the piston;
   a valve body provided within the valve main body, and opened and closed by the piston;
   an air switch valve portion provided within the valve main body for switching air supply and air discharge; and
   a manual operation mechanism portion for operating the air switch valve portion,
   wherein the manual operation mechanism portion comprises a manual operation handle and a ball valve portion provided in a lower portion of the manual operation handle and having a three-way port, the three-way port comprising an air supply port, a purge port for purging the air within the valve main body and an air supply tube part for supplying the air to one side of the piston, the air supply port and purge port being operated by a rotating operation of the manual operation handle.

7. The composite valve according to claim 6, further comprising a pressing member connected with a connection portion of a serration mechanism to a lower portion of the stem by a pressing and then rotating operation of the manual operation handle and moved in an axial direction within the valve main body with an outer peripheral thread structure to press the piston or directly press the valve body at a lower end portion of the pressing member.

8. The composite valve according to claim 7, wherein the manual operation handle is formed therein with a lock hole, the valve main body is provided with a lock plate having a lock engagement portion that is freely taken inside and outside of the valve main body and lapped with the lock hole, and the manual operation handle is firmly fixed to the valve main body with a lock member used for the lapped lock engagement portion and lock hole.

9. The composite valve according to claim 6, further comprising a pressing member connected with a connection portion of a serration mechanism to the air supply tube part of the ball valve portion by a rotating operation of the manual operation handle and moved in an axial direction within the valve main body with an outer peripheral thread structure to press the piston or directly press the valve body at a lower end portion of the pressing member.

10. The composite valve according to claim 9, wherein the manual operation handle is formed therein with a lock hole, the valve main body is provided with a lock plate having a lock engagement portion that is freely taken inside and outside of the valve main body and lapped with the lock hole, and the manual operation handle is firmly fixed to the valve main body with a lock member used for the lapped lock engagement portion and lock hole.

11. The composite valve according to claim 6, wherein the manual operation handle is formed therein with a lock hole, the valve main body is provided with a lock plate having a lock engagement portion that is freely taken inside and outside of the valve main body and lapped with the lock hole, and the manual operation handle is firmly fixed to the valve main body with a lock member used for the lapped lock engagement portion and lock hole.

12. The composite valve according to claim 6, wherein the valve body is a diaphragm that is separated from a valve seat with ascent of the piston and is pressed against the valve seat with the snapping force of the spring.

* * * * *